Oct. 29, 1929.   A. H. TRAGESER ET AL   1,733,922
METHOD OF WELDING COPPER BOILER ENDS
Filed Nov. 24, 1928
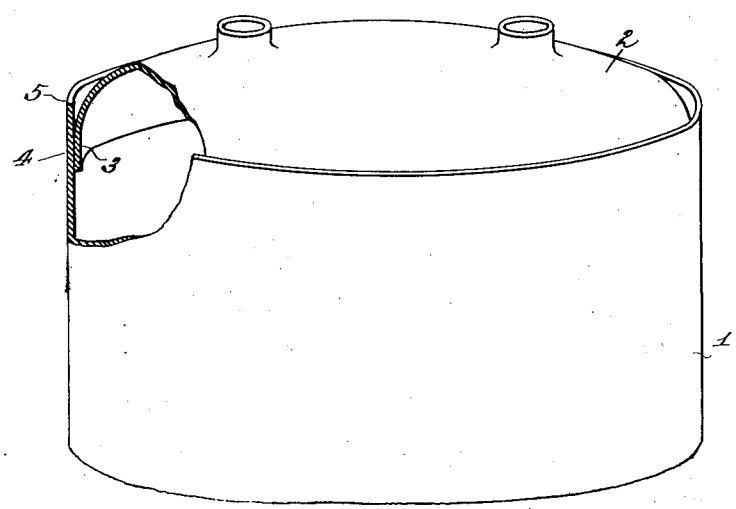
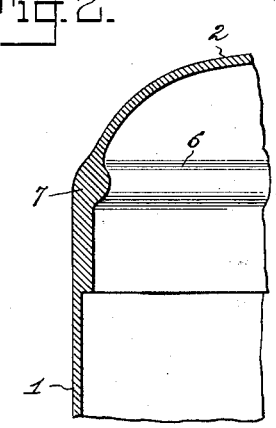
WITNESSES
INVENTOR
ALBERT H. TRAGESER
LOUIS HASSINGER
BY
ATTORNEY Patented Oct. 29, 1929

1,733,922

UNITED STATES PATENT OFFICE

ALBERT H. TRAGESER AND LOUIS HASSINGER, OF NEW YORK, N. Y.

METHOD OF WELDING COPPER-BOILER ENDS

Application filed November 24, 1928. Serial No. 321,729.

This invention relates to an improved method of welding the ends of copper boilers, the object being to provide an improved method and a finished product which is superior to the methods and products heretofore produced.

Another object of the invention is to provide an improved method wherein the parts are so positioned and the welding spear is so moved that part of the shell or body of a boiler is boiled down and melted and caused to fuse into the annular lower edge of the boiler head so as to present an extra-thick portion at this point extending inwardly and thereby present a strong structure, as well as a water and steam tight structure.

A further object, more specifically, is to provide an improved copper boiler formed with welded ends having an extra-thickened portion presenting an internal bead at the point where the head joins the shell or body of the boiler.

A still further object of the invention is to provide an improved method of welding a copper boiler end and making a water-tight non-porous weld.

In the accompanying drawings,—

Figure 1 is a perspective view showing the upper part of a boiler with certain parts broken away illustrating the position of the parts before the welding operation;

Figure 2 is a fragmentary sectional view similar to the right-hand part of Figure 1 but with the parts properly welded.

Referring to the accompanying drawing by numerals, 1 indicates the body or shell of the boiler and 2 the upper end. The lower part of the shell and lower end have not been shown, as they are of the same structure as the upper part, as far as the welding and and seam are concerned. When assembling the parts for welding the head 2 is arranged as shown in Figure 1 with the tubular portion 3 fitting flatwise against the upper section 4 of the shell 1. An extra portion 5 projects above portion 4 and above the tubular portion 3. When the parts are in this position the welding head is brought into contact with the extending portion of flange 5 and the same is melted or burned down until it is substantially flush with the end 2. In burning down or melting the flange 5 the portions 3 and 4 become substantially melted, though not sufficiently to flow as a liquid. This melting of the parts causes the flange 5 to move down and the other parts to move until the resulting structure is as shown in Figure 2, wherein an appreciable bead 6 is presented interiorly and the parts adjacent the point 7 are one integral mass. In welding the parts as just set forth a certain voltage and certain amperage are used for a certain thickness of metal, and also a certain speed of movement of the welding tool is maintained. The welding tool used is an electric tool using the arc method. As an example of the exact current used where the hull or shell 1 is made of No. 17 sheet copper and the head 2 is made of No. 14 sheet copper, the amperage is 225 at a voltage of 75, while the speed of the welding tool is at the rate of 38 inches in 75 seconds. These particular figures have been found to be true, but it is evident that slight variations may be made therefrom, though generally speaking, this proportion is best because it produces the desired melting of the flange 5 and also the desired movement of parts 3 and 4, so that all parts will assume the form illustrated in Figure 2 when the welding action is completed. Where the metal is thinner a different proportion of voltage and speed must be used. If the same amperage and voltage are used the speed must be greater, whereas if the speed is the same the amperage should be less. It will be noted that the flange or extension 5 is integral with the shell 1, and consequently will transmit the heat quicker to the section or portion 4 than if the parts were separate members. Also, the metal is of the same quality and consequently will merge together in a better way than if a separate wire or piece of copper were used in place of the flange 5.

It will thus be seen that by using an integral projection a water-tight non-porous weld may be secured in copper boiler ends which has never been done heretofore. Also, this method produces a mechanically strong joint, as clearly illustrated in Figure 2. Heretofore attempts have been made to weld copper pieces together, but the results were not entirely satisfactory because of the arrangement of parts, the heat and other parts in connection with the weld. In the present invention, a non-porous, water and steam-tight weld is produced and also a structurally strong joint is produced through the use of an integral projection, as for instance, projection 5 and also through the use of an exact heat applied in a proper manner and at the exact time necessary to melt the projection and cause the adjacent parts to merge together and form one solid integral piece.

What we claim is:—

1. The method of welding the end on a copper boiler, consisting in fitting the end into the end portion of the shell of the boiler, so that part of the shell of the boiler will project beyond the end, and then applying heat by an electric torch to the portion of the shell projecting beyond the end, said torch being maintained in position until the entire projecting portion has been melted and caused to merge into the lower part of the end.

2. The method of welding copper boiler ends, consisting in mechanically positioning a copper boiler end near the end of the shell of the boiler and in such a position that the extreme end of the shell of the boiler will present a flange projecting beyond the end to be welded, and then applying an electric torch to said flange and moving the same along the flange as it is melted, the temperature and speed of the welding implement being such as to cause said flange to completely melt and the parts adjacent the flange to merge together.

3. The method of welding the end of a copper boiler to the shell, consisting in positioning the edge of an end into the end portion of the shell a sufficient distance to produce a flange integral with the shell and extending beyond the said end, applying an electric arc-welding tool to said flange at a given point, maintaining the tool at said given point until the flange has been melted and the contacting portions of the end and the shell are merged into one piece with a part projecting inwardly, and then moving the welding tool along the flange at a speed which will cause the flange to be melted progressively and in the same manner as at the point where the tool was first applied.

4. A copper boiler, including an end, a shell and a welded joint connecting the end and the shell, said joint having the end portion of the shell merging integrally into the edge of the end and into an integral bead extending inwardly.

5. The method of welding the end of a copper boiler to the shell, consisting in assembling the end and shell so that there will be an integral projection extending from the point of contact of the two members, and then applying heat to said projection and maintaining the heat applied thereto sufficiently long to completely melt the projection and cause the parts adjacent the projection to merge into a solid water-tight non-porous weld.

6. The method of welding the end of a copper boiler to the shell and producing a water-tight and non-porous joint consisting in mechanically fitting the end to the shell so that there will be a projection from one of the parts integral therewith, and then applying heat to said projection until it is melted and merged into the contacting parts.

LOUIS HASSINGER.
ALBERT H. TRAGESER.